(12) United States Patent
Tumanov

(10) Patent No.: US 9,480,242 B1
(45) Date of Patent: Nov. 1, 2016

(54) WISH FISH SYSTEM

(71) Applicant: Nikolay V. Tumanov, Clearwater, FL (US)

(72) Inventor: Nikolay V. Tumanov, Clearwater, FL (US)

( * ) Notice: Subject to any disclaimer, the term of this patent is extended or adjusted under 35 U.S.C. 154(b) by 0 days.

(21) Appl. No.: 15/009,123

(22) Filed: Jan. 28, 2016

(51) Int. Cl.
*A01K 63/00* (2006.01)
*A63F 9/00* (2006.01)

(52) U.S. Cl.
CPC .............. *A01K 63/006* (2013.01); *A63F 9/001* (2013.01); *A63F 2009/0012* (2013.01); *A63F 2009/0033* (2013.01)

(58) Field of Classification Search
CPC .............................. A01K 63/006; A63F 9/001
See application file for complete search history.

(56) References Cited

U.S. PATENT DOCUMENTS

| 3,717,125 A * | 2/1973 | Sanders | A01K 61/025 119/51.11 |
| 4,256,058 A * | 3/1981 | Deakins | A01K 61/025 119/51.11 |
| 5,003,925 A * | 4/1991 | Roberts | A01K 61/025 119/51.01 |
| 5,133,292 A * | 7/1992 | Kirk | A01K 61/025 119/51.04 |
| 5,709,166 A * | 1/1998 | Evans | A01K 5/02 119/51.04 |
| 5,873,326 A * | 2/1999 | Davet | A01K 61/025 119/245 |
| 6,009,835 A * | 1/2000 | Boschert | A01K 61/025 119/51.04 |
| 6,694,917 B1 * | 2/2004 | Wang | A01K 5/0291 119/51.04 |
| 8,171,884 B2 * | 5/2012 | Dornburg | A01K 61/02 119/51.04 |

\* cited by examiner

*Primary Examiner* — Christopher P Ellis
*Assistant Examiner* — Michael Wang

(57) ABSTRACT

An aquarium fabricated of a transparent material contains water. A housing retaining the aquarium has an opening for displaying the aquarium including fish swimming in the aquarium. Player components on the housing include a payment assembly and a feeding button. Operational components within the housing include a feeder assembly with fish food. An intelligent electronic controller is within the housing. A line couples the intelligent electronic controller to the feeder assembly for dispensing fish food in response to activating the payment assembly and depressing the feeding button. A timer allows dispensing of fish food at regularly timed intervals.

11 Claims, 3 Drawing Sheets

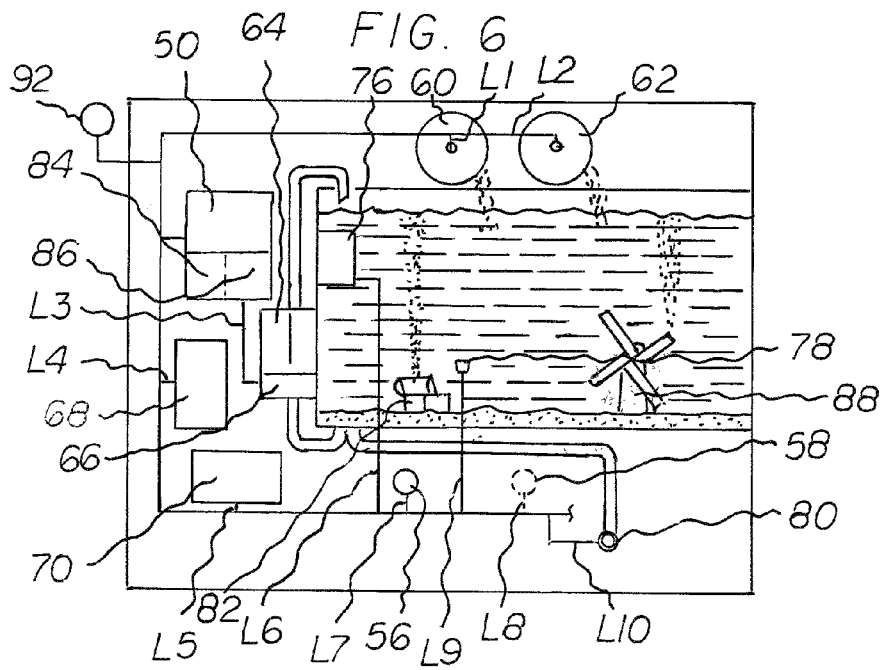
FIG. 6
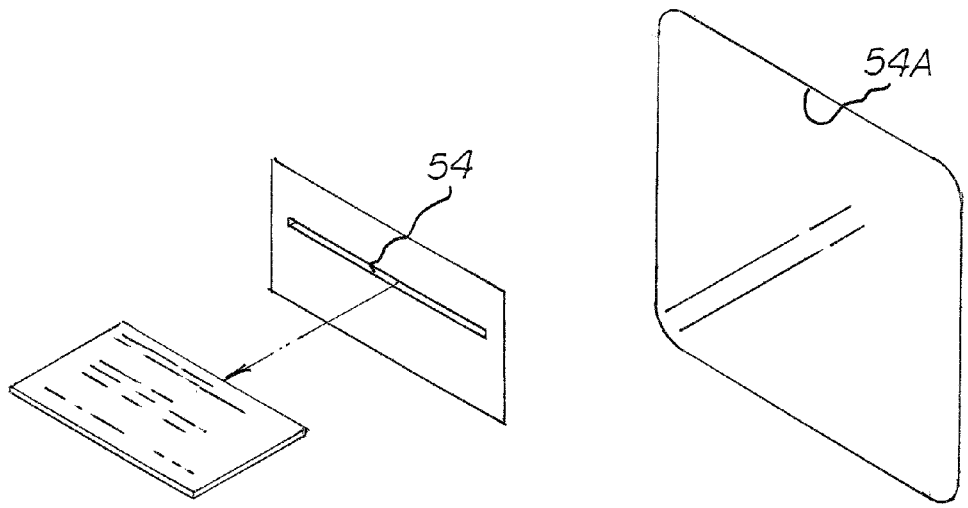
FIG. 7
FIG. 8

WISH FISH SYSTEM

BACKGROUND OF THE INVENTION

Field of the Invention

The present invention relates to a Wish Fish game system and more particularly pertains to playing a game with controls for feeding fish, and for activating interactive toys, and for dispensing a souvenir to a player, the playing and feeding and activating and dispensing being done in an entertaining, educational, safe, convenient, and economical manner.

SUMMARY OF THE INVENTION

In view of the disadvantages inherent in the known types of game systems of known designs and configurations now present in the prior art, the present invention provides an improved game system. As such, the general purpose of the present invention, which will be described subsequently in greater detail, is to provide a new and improved game system and method which has all the advantages of the prior art and none of the disadvantages.

From a broad viewpoint, the present invention is a fish wish system. An aquarium fabricated of a transparent material contains water. A housing retaining the aquarium has an opening for displaying the aquarium including fish swimming in the aquarium. Player components on the housing include a payment assembly and a feeding button. Operational components within the housing include a feeder assembly with a first food of a lesser nutritional value and a second fish food of a greater nutritional value. An intelligent electronic controller is within the housing. A line couples the intelligent electronic controller to the feeder assembly for dispensing a fish food in response to activating the payment assembly and depressing the feeding button. A timer allows dispensing of a fish food at regularly timed intervals.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved game system which has all of the advantages of the prior art fish feeding systems of known designs and configurations and none of the disadvantages.

It is another object of the present invention to provide a new and improved game system which may be easily and efficiently manufactured and marketed.

It is a further object of the present invention to provide a new and improved game system which is of durable and reliable constructions.

An even further object of the present invention is to provide a new and improved game system which is susceptible of a low cost of manufacture with regard to both materials and labor, and which accordingly is then susceptible of low prices of sale, thereby making such game system economically available.

Lastly, another object of the present invention is to provide a game system for playing a game, for feeding fish, and for dispensing a souvenir to a player, the playing and feeding and dispensing being done in an entertaining, educational, safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross sectional view of the system taken at line 6-6 of FIG. 2.

FIG. 7 is a perspective view of a dispenser for providing a player with a souvenir.

FIG. 8 is a perspective view of an alternate dispenser for providing a player with a souvenir toy.

The same reference numerals refer to the same parts throughout the various Figures.

DESCRIPTION OF THE PREFERRED EMBODIMENT

Figure 1:
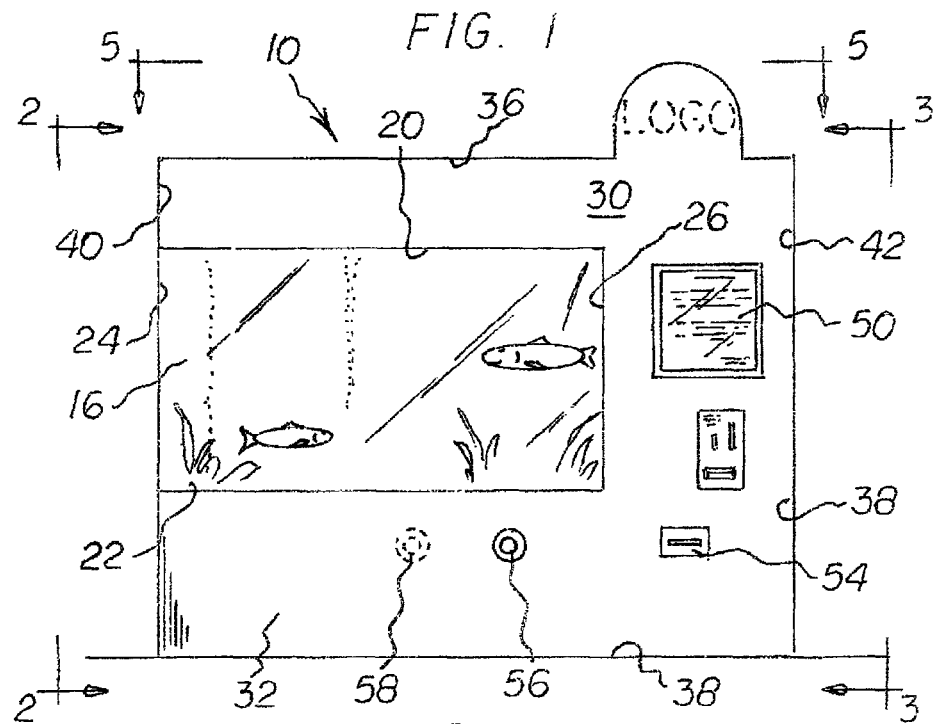
FIG. 1 is a front elevational view of a game system constructed in accordance with the principles of the present invention.
Figures 2, 3:
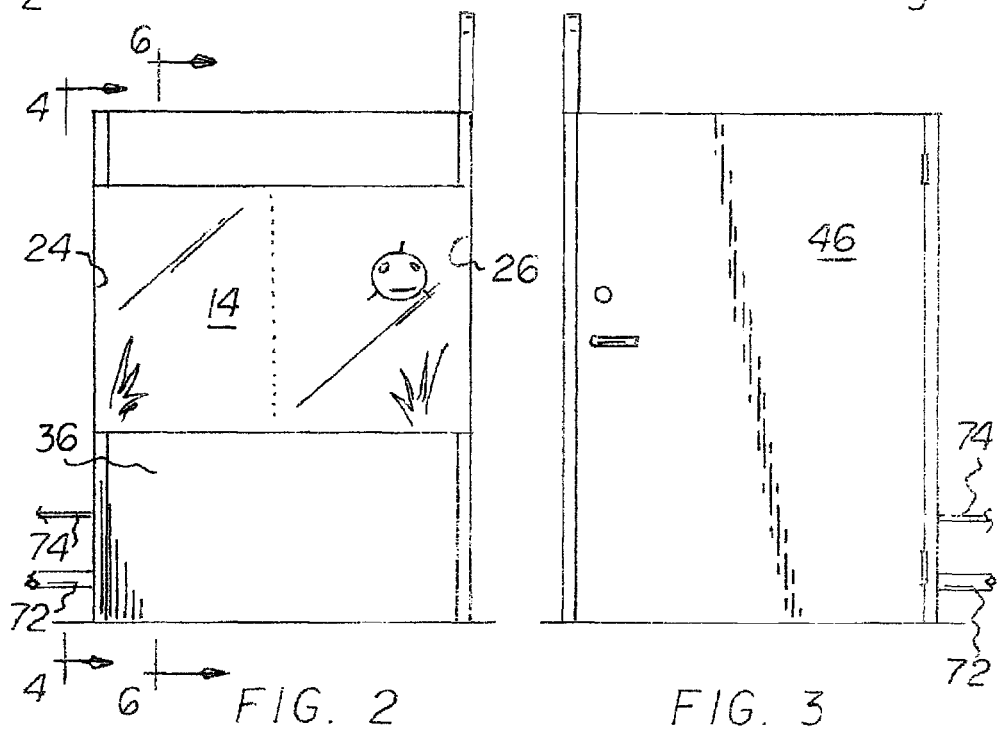
FIG. 2 is a left side elevational view of the system taken at line 2-2 of FIG. 1.
FIG. 3 is a right side elevational view of the system taken at line 3-3 of FIG. 1.
Figure 4:
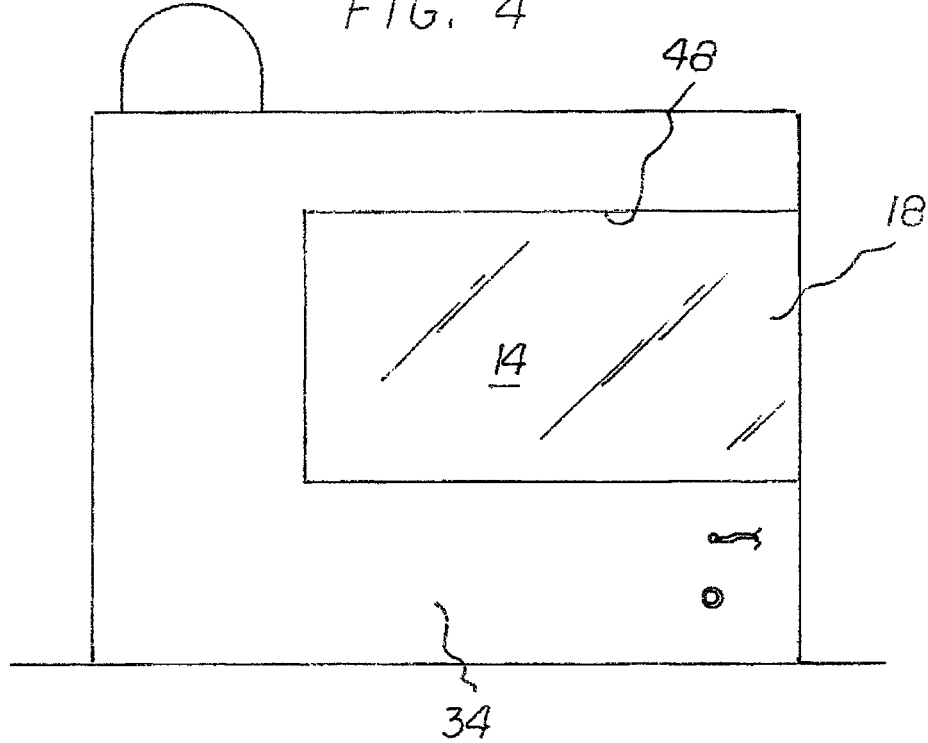
FIG. 4 is a rear elevational view of the system taken at line 4-4 of FIG. 2.
Figure 5:
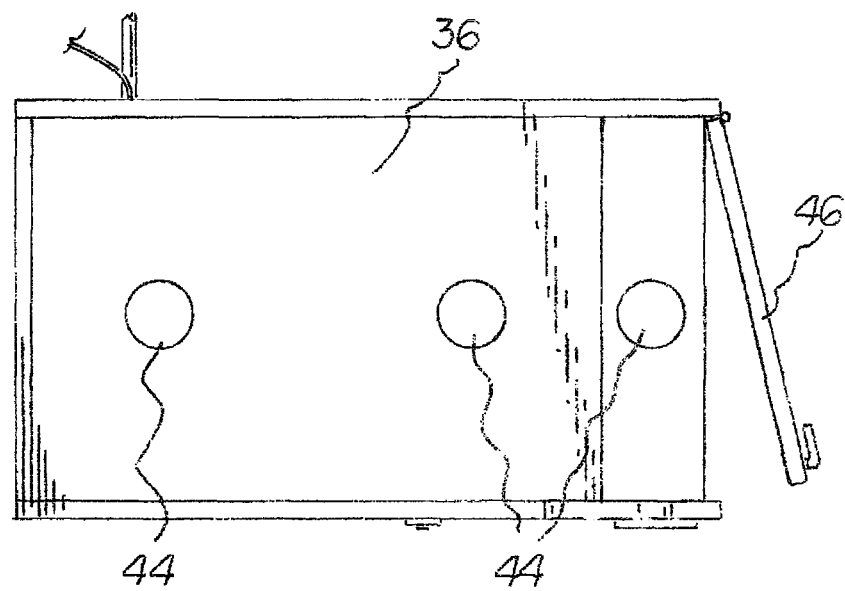
FIG. 5 is a plan view of the system taken at line 5-5 of FIG. 1.

With reference now to the drawings, and in particular to FIG. 1 thereof, the preferred embodiment of the new and improved game system embodying the principles and concepts of the present invention and generally designated by the reference numeral 10 will be described.

The present invention, the Wish Fish game system 10 is comprised of a plurality of components. Such components in their broadest context include an aquarium, a housing, player components, operational components, and an intelligent electronic controller. Such components are individually configured and correlated with respect to each other so as to attain the desired objective.

First provided is an aquarium 14. The aquarium is rectilinear in configuration. The aquarium contains water with fish. The aquarium is formed with an aquarium front 16, an aquarium rear 18, an open aquarium top 20, an aquarium bottom 22, an aquarium left side 24, and an aquarium right side 26. The aquarium is fabricated of a rigid transparent material.

A housing 30 is provided. The housing is rectilinear in configuration. The housing retains the aquarium. The housing has a housing front 32, a housing rear 34, a housing top 36, and a housing bottom 38, a housing left side 40, and a housing right side 42. The housing is fabricated of a rigid opaque material. The housing top has air holes 44. The housing right side has a door 46 for access to the interior of the housing. The housing has an opening 48 extending through the aquarium front and aquarium rear and aquarium left side for displaying the aquarium including fish swimming in the aquarium.

Player components are provided on the housing front. The player components include a monitor 50 for displaying and inputting information. The player components include a payment assembly 52 for paying for play. The player components include a souvenir dispenser 54. The souvenir dispenser is formed as a slot for dispensing a flat souvenir. An optional souvenir dispenser 54A is in a rectangular in configuration for dispensing a three-dimensional toy souvenir toy. A feeding button 56 is provided. As an option, a bubbler button 58 is provided.

Operational components are located within the housing. The operational components include a first feeder 60 with a first fish feed of lesser nutritional value. The operational components include a second feeder 62 with a second fish food of greater nutritional value. The operational components include a filter 64. The filter has a filter motor 66. The operational components include a payment module 68 coupled to the payment assembly. The operational components include a dispenser module 70 coupled to the dispenser assembly. The operational components include a water input pipe 72. The operational components include an electrical line 74 coupled to the intelligent electronic controller for powering the system. The operational components include a wave machine 76 for agitating the water to generate waves. The waves are created by an air flow. Such air flow also provides motion to a plurality of interactive toys. The interactive toys include a treasure chest 82 with a lid which pivots open and closed in response to the air flow. The interactive toys also include a wind mill 84 with arms which rotate in response to the air flow. The operational components further include a water sensor 78 to determine the chemical characteristics of the water. The operational components further include an add water valve 88 for adding water to the aquarium as needed. Lastly, the operational components include a proximity sensor 92 to determine the presence of potential player and for generating attraction features of the system to stimulate interest.

Further provided is an intelligent electronic controller 84 and a modem 86. The modem is operatively coupled to the monitor. The monitor functions to display information from the intelligent electronic controller and to transmit information to the intelligent electronic controller. The intelligent electronic controller has a SIM card and a timer. A first line L-1 couples the intelligent electronic controller to the first feeder for dispensing a fish food consumable by fish but of lesser nutritional value. A second line L-2 couples the intelligent electronic controller to the second feeder for dispensing a second fish food of greater nutritional value at regularly timed intervals. A third line L-3 couples the intelligent electronic controller to the filter motor for filtering the water. A fourth line L-4 couples the intelligent electronic controller to the payment module for activating the payment module upon receipt of payment by a player. A fifth line L-5 couples the intelligent electronic controller to the dispensing module to dispense a souvenir following a player feeding fish. A sixth line L-6 couples the intelligent electronic controller to the wave machine for agitating water in the aquarium to cause waves. A seventh line L-7 couples the intelligent electronic controller to the first button for dispensing nutritional fish food following activation of the payment module and depressing of the first button. An eighth line L-8 couples the intelligent electronic controller to the second button for activating the wave machine following activation of the payment module and depressing the second button. A ninth line L-9 couples the intelligent electronic controller to the water sensor to display on the monitor instructions to modify the chemical contents of water in the aquarium. A tenth line L-10 couples the intelligent electronic controller to the add water valve for adding water to the aquarium upon a visual observing of a lowering of a water level in the aquarium.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game system comprising:
an aquarium fabricated of a transparent material, the aquarium containing water;
a housing retaining the aquarium, the housing having an opening for displaying the aquarium including fish swimming in the aquarium;
player components on the housing, the player components including a payment assembly and a feeding station, wherein the player components further include a souvenir dispenser;
operational components located within the housing, the operational housing including a feeder assembly with fish food; and
an intelligent electronic controller located within the housing with a line coupling the intelligent electronic controller to the feeder assembly for dispensing fish food in response to activating the payment assembly and the depressing of the feeding button and for dispensing fish food at regularly timed intervals.

2. The system as set forth in claim 1 wherein fish food is a first food and a second food, the feeder assembly including a first feeder containing the first food and a second feeder containing the second food.

3. The system as set forth in claim 1 wherein the souvenir dispenser is a slot for dispensing a flat souvenir.

4. The system as set forth in claim 1 wherein the souvenir dispenser is enlarged for dispensing a three dimensional souvenir toy.

5. The system as set forth in claim 1 wherein the player components further include a monitor coupled to the intelligent electronic controller for displaying information from the intelligent electronic controller and for transmitting information to the intelligent electronic controller.

6. The system as set forth in claim 1 wherein the operational components further include a payment module and a dispenser module.

7. The system as set forth in claim 1 wherein the intelligent electronic controller further includes a modem.

8. The system as set forth in claim 1 and further comprising:
an interactive toy including a treasure chest (82) with a lid which opens and closes in response to an air flow.

9. The system as set forth in claim 1 and further comprising:
an interactive toy including a windmill (84) with arms which rotate in response to an air flow.

10. The system as set forth in claim 1 wherein the fish food includes a first fish food dispensed in response to activating the payment assembly and the depressing of the feeding button and a second fish food dispensed at regularly timed intervals.

11. A Wish Fish game system (10) for playing a game with controls for feeding fish, and for activating and inactivating interactive toys, and for dispensing a souvenir to a player, the playing and feeding and activating and dispensing being done in an entertaining, educational, safe, convenient, and economical manner, the system comprising, in combination:
an aquarium (14) in a rectilinear configuration having water with fish, the aquarium formed with an aquarium front (16), an aquarium rear (18), an open aquarium top (20), an aquarium bottom (22), an aquarium left side (24), an aquarium right side (26), the aquarium being fabricated of a rigid transparent material;
a housing (30) in a rectilinear configuration retaining the aquarium, the housing having a housing front (32), a housing rear (34), a housing top (36), a housing bottom (38), a housing left side (40), a housing right side (42), the housing being fabricated of a rigid opaque material with air holes (44) in the housing top, the housing right side having a door (46) for access to interior of the housing, the housing having an opening (48) extending through the aquarium front and aquarium rear and aquarium left side for displaying the aquarium including fish swimming in the aquarium;
player components on the housing front, the player components including a monitor (50) for displaying and inputting information, a payment assembly (52) for paying for play, a souvenir dispenser (54) formed as a slot for dispensing a flat souvenir, a feeding button (56), and a bubbler button (58);
operational components located within the housing, the operational components including a first feeder (60) with first fish food of lesser nutritional value, a second feeder (62) with second fish food of greater nutritional value, a filter (64) with a filter motor (66), a payment module (68) coupled to the payment assembly, the dispenser module (70) coupled to the dispenser assembly, a water input pipe (72), an electrical line (74) coupled to the intelligent electronic controller for powering the system, a wave machine (76) with an air flow for agitating the water to generate waves, a plurality of interactive toys including a treasure chest (82) and a windmill (84) activated by an air flow, a water sensor (78) to determine the chemical characteristics of the water, and an add water valve (88) for adding water to the aquarium as determined by a level sensor, a proximity sensor (92) to determine the presence of potential player and for generating attraction features of the system to stimulate interest in potential players; and
an intelligent electronic controller (84) and a modem (86) operatively coupled to the monitor whereby the monitor functions to display information from the intelligent electronic controller and the monitor functions to transmit information to the intelligent electronic controller, the intelligent electronic controller having a SIM card and a timer, a first line (L-1) coupling the intelligent electronic controller to the first feeder for dispensing fish food consumable by fish but of lesser nutritional value, a second line (L-2) coupling the intelligent electronic controller to the second feeder for dispensing fish food of greater nutritional value at regularly timed intervals, a third line (L-3) coupling the intelligent electronic controller to the filter motor for filtering the water, a fourth line (L-4) coupling the intelligent electronic controller to the payment module for activating the payment module upon receipt of payment by a player, a fifth line (L-5) coupling the intelligent electronic controller to the dispensing module to dispense a souvenir following player feeding fish, a sixth line (L-6) coupling the intelligent electronic controller to the wave machine for agitating water in the aquarium to cause waves, a seventh line (L-7) coupling the intelligent electronic controller to the first button for dispensing nutritional fish food following activation of the payment module and the depressing of the first button, an eighth line (L-8) coupling the intelligent electronic controller to the second button for activating the wave machine following activation of the payment module and the depressing the second button, a ninth line (L-9) coupling the intelligent electronic controller to the water sensor to display on the monitor instructions to modify the chemical contents of water in the aquarium, a tenth line (L-10) coupling the intelligent electronic controller to the add water valve for adding water to the aquarium upon detection of a lowering of a water level in the aquarium.

* * * * *